United States Patent [19]

Knowles

[11] 3,999,917

[45] Dec. 28, 1976

[54] HEAT DISTRIBUTION AND ISOLATING MOLD SUPPORT

[75] Inventor: William L. Knowles, Dallas, Tex.

[73] Assignee: K-N-P, A Joint Venture, Dallas, Tex.

[22] Filed: Feb. 2, 1976

[21] Appl. No.: 654,652

[52] U.S. Cl. ................................ 425/145; 249/79; 425/407

[51] Int. Cl.$^2$ ........................................... B29J 5/08

[58] Field of Search .................. 425/144, 145, 200; 249/79; 100/281

[56] References Cited

UNITED STATES PATENTS

| | | | |
|---|---|---|---|
| 3,142,185 | 7/1964 | Knowles | 100/281 X |
| 3,229,009 | 1/1966 | Knowles | 425/200 X |
| 3,242,527 | 3/1966 | Rosenberg | 425/445 X |
| 3,868,204 | 2/1975 | Bongers | 425/445 X |
| 3,950,118 | 4/1976 | Adair | 425/144 |

*Primary Examiner*—J. Howard Flint, Jr.
*Attorney, Agent, or Firm*—Richards, Harris and Medlock

[57] ABSTRACT

A mold assembly for use in heat forming granular material into a discontinuous cross-sectional board. The mold assembly has an upper and lower frame and two mold halves forming a mold cavity therebetween. The mold halves are coupled to the frame by means of spacer bars. The spacer bars are designed to minimize conduction of heat from the mold to the frame and are positioned over peripheral heaters in the mold to minimize heat gradients within the mold. In addition, the spacer bars minimize heat distortion of the frame members. The interior of the mold is provided with a first array of heaters extending parallel to the longitudinal axis of the mold near the surfaces of the mold halves remote from the mold cavity. A second array of heaters extend through the mold halves parallel to the longitudinal axis of the mold adjacent the surfaces of the mold cavity. The heaters in the first and second array are independently controlled to maintain a constant temperature through the cross-section of the mold. The heaters further have a variable output capacity along their length to maintain a constant temperature along the longitudinal axis of the mold.

17 Claims, 4 Drawing Figures

HEAT DISTRIBUTION AND ISOLATING MOLD SUPPORT

BACKGROUND AND SUMMARY OF THE INVENTION

The present invention relates to improvements in apparatus for manufacturing discontinuous cross-sectional structural board from granular materials.

In the manufacture of discontinuous cross-sectional structural boards from granular material, it is conventional to use apparatus as described in U.S. Pat. No. 3,229,009, issued Jan. 11, 1966, entitled "METHOD AND APPARATUS FOR FORMING COMPOSITION BOARD" and U.S. Pat. No. 3,142,185, issued July 28, 1964, entitled "PISTON STROKE ADJUSTMENT". In apparatus of this type, particulate material, such as various types of wood sawdust, wood chips, wood scraps and the like, which have been comminuted, are used in the formation of structural members. The particulate material is conventionally mixed with thermosetting adhesive and is then forced through a heated mold. In molding these products, economic factors make it desirable to obtain as high a rate of production as possible while maintaining the uniformity of the finished board.

In the extrusion process, the density of the product is partially controlled by surface friction on the material as it is forced through the mold cavity. Thus, any distortion of the mold cavity, either from internal pressures, external forces or distortion of mold sections, can vary the surface friction and thus produce a product of uneven density. Distortion in the mold cavity can likewise result in a distorted finished product. During extreme cases, distortion, of the mold cavity can prevent operation of the molding process.

Therefore, one of the problems encountered in designing equipment for molding particulate material is that of producing a molding system where distortion of the mold cavity is minimized. To achieve this goal, it is necessary to minimize, or eliminate, differential expansion within the mold due to variations in operating temperature. It is therefore, important to not only maintain a uniform temperature within the mold assembly itself, but to locate the heated mold from frame members which surround the mold assembly and supply the compressional forces exerted on the materials during the extruding process.

Machine frame distortions caused by heat conducted from a heated mold assembly can cause a drastic distortion of the mold cavity. The massive head and base members surrounding the heated mold assembly are subject to becoming hotter in areas close to the mold than in the more remote areas. For example, when heat from the mold is conducted into the adjacent lower portions of the upper frame member, the temperature in the lower portion becomes higher than that in the top portion. This causes a lateral expansion in a hotter lower portion causing the frame member to bow downward in the center between the side supports. A similar distortion occurs in the frame member adjacent the lower mold section. This uneven expansion results in tremendous forces against the midsection of the top and bottom mold sections, causing them to deform and thus reducing the uniform thickness of the mold cavity. While the internal forces from molding the granular material acts opposite to the inwardly directed force caused by the uneven expansion, these forces will not prevent the deformation of the mold cavity.

This distortion not only interfers with the entry of the plunger into the mold cavity but also causes a thinner board section toward the center of the cavity mold. It further alters uniform feeding and frictional forces on the surface of the material passing through the mold cavity.

Therefore, there exists a need for an improved molding apparatus capable of minimizing the mold distortion due to heat gradients. The present invention provides an improved mold apparatus which is provided with spaced bars for connecting the frame to the mold and in which the spacer bars are provided with longitudinal prongs for engaging the mold surface. The faces of the prongs contacting the mold surface are of sufficient area so that molding pressures will not cause the prongs to be embedded in the mold surface while being sufficiently narrow to limit the area contact between the mold and the bars. The remaining surfaces of the mold and the surfaces of the spacer bars created by the prongs thus become radiating surfaces to dissipate heat conducted into the spaced bars. The outer face of the spacer bars are likewise slotted to reduce the contact area in which the bars engage the frame members. The surface areas between these longitudinal slots thus become additional radiating surfaces to further reduce heat conduction into the frame.

It is preferable that the prongs on one surface of the spacer bar and the extensions on the opposite surface between the slots are staggered in lateral relationship to minimize the direct paths for heat conduction from the mold sections to the frame. The remaining center section of the spacer bars are cored for water or other coolant circulation. Thus, by cooling the solid sections between the prongs bearing on the mold and the portions in contact with the frame, heat conducted from the mold into the frame is effectively reduced or eliminated. In addition, heaters are formed in the mold adjacent the peripheral surfaces thereof and are operated to maintain the periphery of the mold at a constant temperature. These longitudinally spaced resistance heaters are installed close to the outer surfaces of the mold assembly. These heaters are conventionally placed immediately under each prong of the spacer bars to thus reduce heat differential within the mold.

A plurality of longitudinally extending heaters are positioned near the edge of the molds forming the mold cavity. Thermocouples are likewise positioned adjacent the surface of the mold forming the mold cavity and function to control the heaters adjacent thereto. The lineal capacity of these heaters vary along the length of the mold cavity in proportion to the heat requirements of the product moving through the mold and the proximity of the heaters to the ends of the molds.

BRIEF DESCRIPTION OF THE DRAWINGS

The advantages and features of the present invention will be appreciated by considering the accompanying description when considered in conjunction with the accompanying drawings in which.

DESCRIPTION OF THE PREFERRED EMBODIMENT

Figure 1:
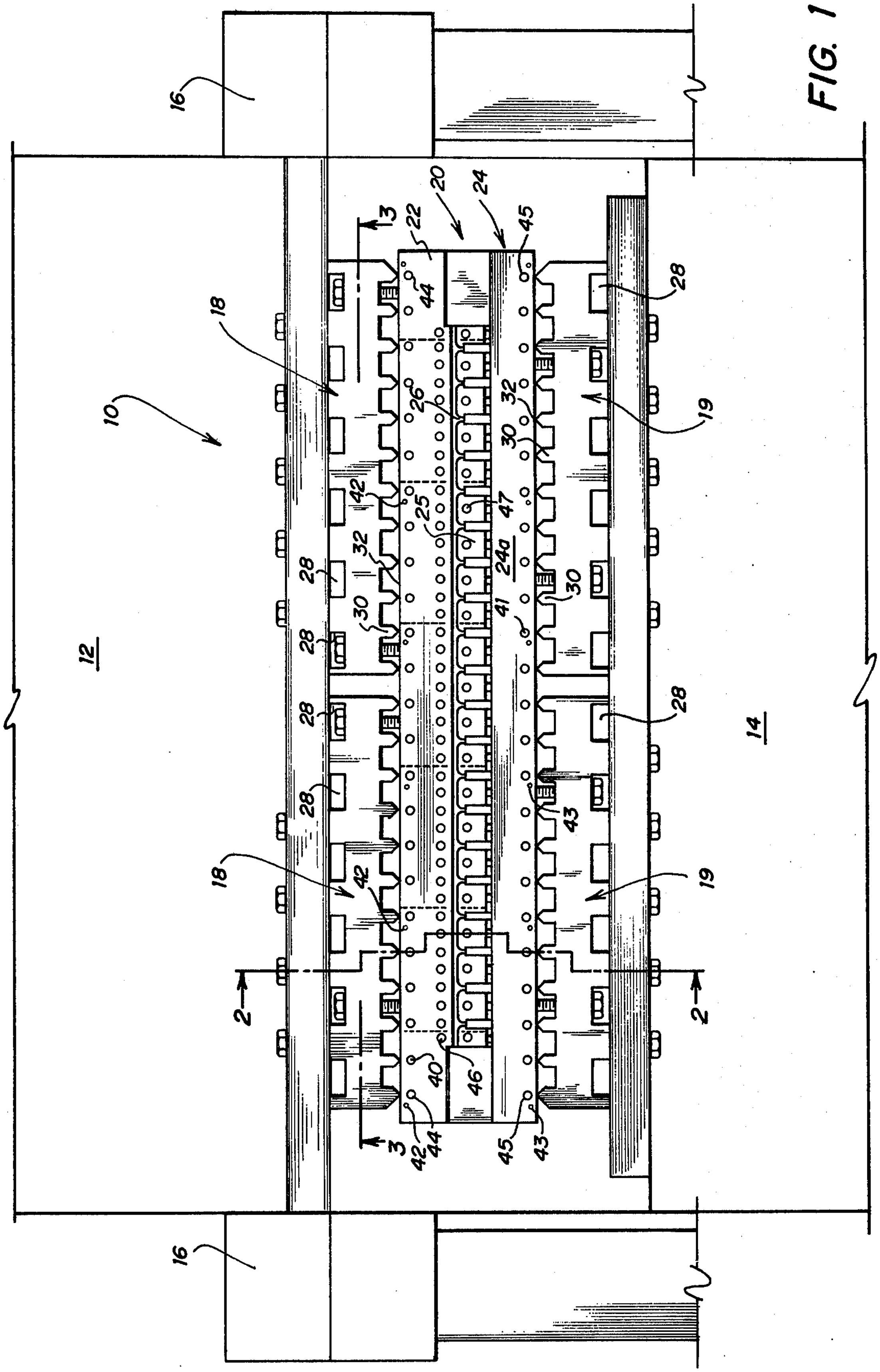
FIG. 1 is an elevation view of the rear end of the mold assembly of the present invention.

Referring now to the Drawings wherein like reference characters designate like or corresponding parts throughout the several views, there is illustrated in the Figures a molding apparatus 10. Apparatus 10 is utilized to mold discontinuous cross-sectional particulate boards such as disclosed in U.S. Pat. No. 3,229,009, issued Jan. 11, 1966, entitled, METHOD AND APPARATUS FOR FORMING COMPOSITION BOARD, which is incorporated herein by reference.

Figure 2:
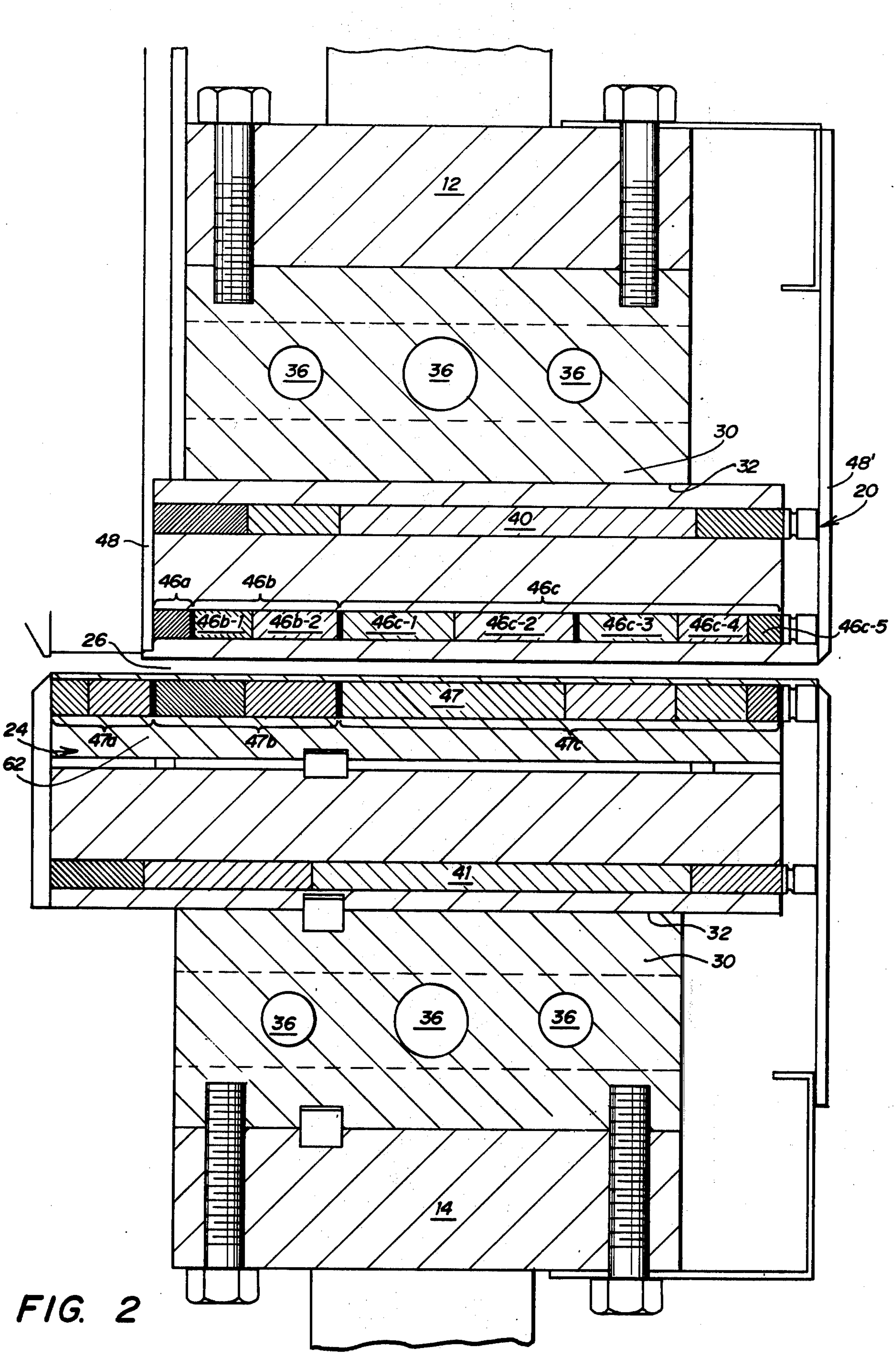
FIG. 2 is a section of the device illustrated in FIG. 1, taken on line 2—2, looking in the direction of the arrows.

Molding apparatus 10 comprises an upper frame 12 with a lower frame 14 which are illustrated in FIGS. 1 and 2. Side members 16 interconnect the upper and lower frames and are utilized to selectively position upper frame 12 relative to lower frame 14. A pair of upper and lower spacer bars 18 and 19, respectively, extend from the upper and lower frames 12 and 14, respectively, and support the mold assembly 20 therebetween. Mold assembly 20 includes an upper mold half 22 and a lower mold half 24, which defines a mold cavity 26 through which the particle board is extruded. Lower mold half 24 includes a lower portion 24*a* for receiving a plurality of laterally spaced longitudinally extending pillow bars 25.

As can be seen in FIGS. 1, upper spacer bar 18 is bolted between and connects frame 12 and upper mold half 22. Likewise, lower spacer bar 19 is bolted between and connects frame 14 and lower mold half 24. Spacer bars 18 and 19 are provided with a plurality of longitudinally extending slots 28 extending along the length thereof on the side facing the frames. The opposite side of each spacer bar is provided with a plurality of V-shaped prongs 30 which engage the outer surface of mold 29 along a contact surface 32. In the preferred embodiment, prongs 30 are positioned opposite slots 28 to decrease the conduction characteristics of spacer bar 18.

Figure 3:
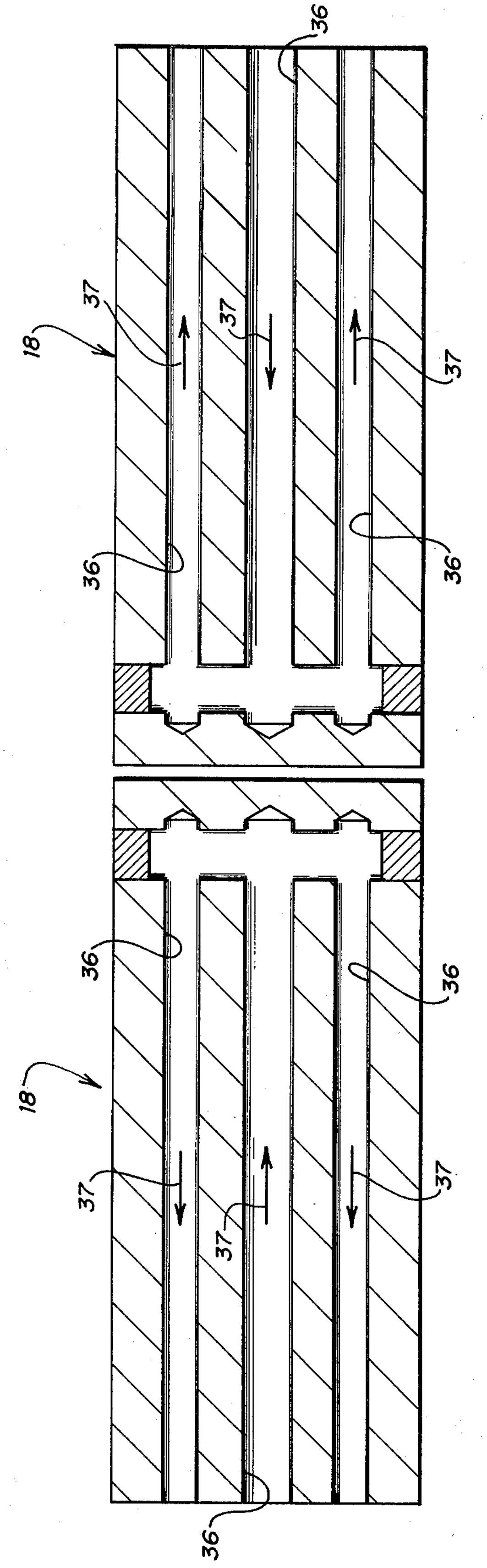
FIG. 3 is a sectional view taken on line 3—3 of FIG. 1, looking in the direction of the arrows.

A sectional view of the upper spacer bar 18 is illustrated in FIG. 3. As can be seen, the spacer bars are provided with a plurality of cooling fluid paths 36, through which cooling liquid is normally circulated in the direction of arrows 37. These cooling fluid paths 36 are formed in the portion of the spacer bar 18 between slots 28 and prongs 30. By circulating fluid through paths 36, spacer bar 18 may be maintained at a reduced temperature during operation of the mold, thereby minimizing heat conduction through the spacer bars.

Figure 4:
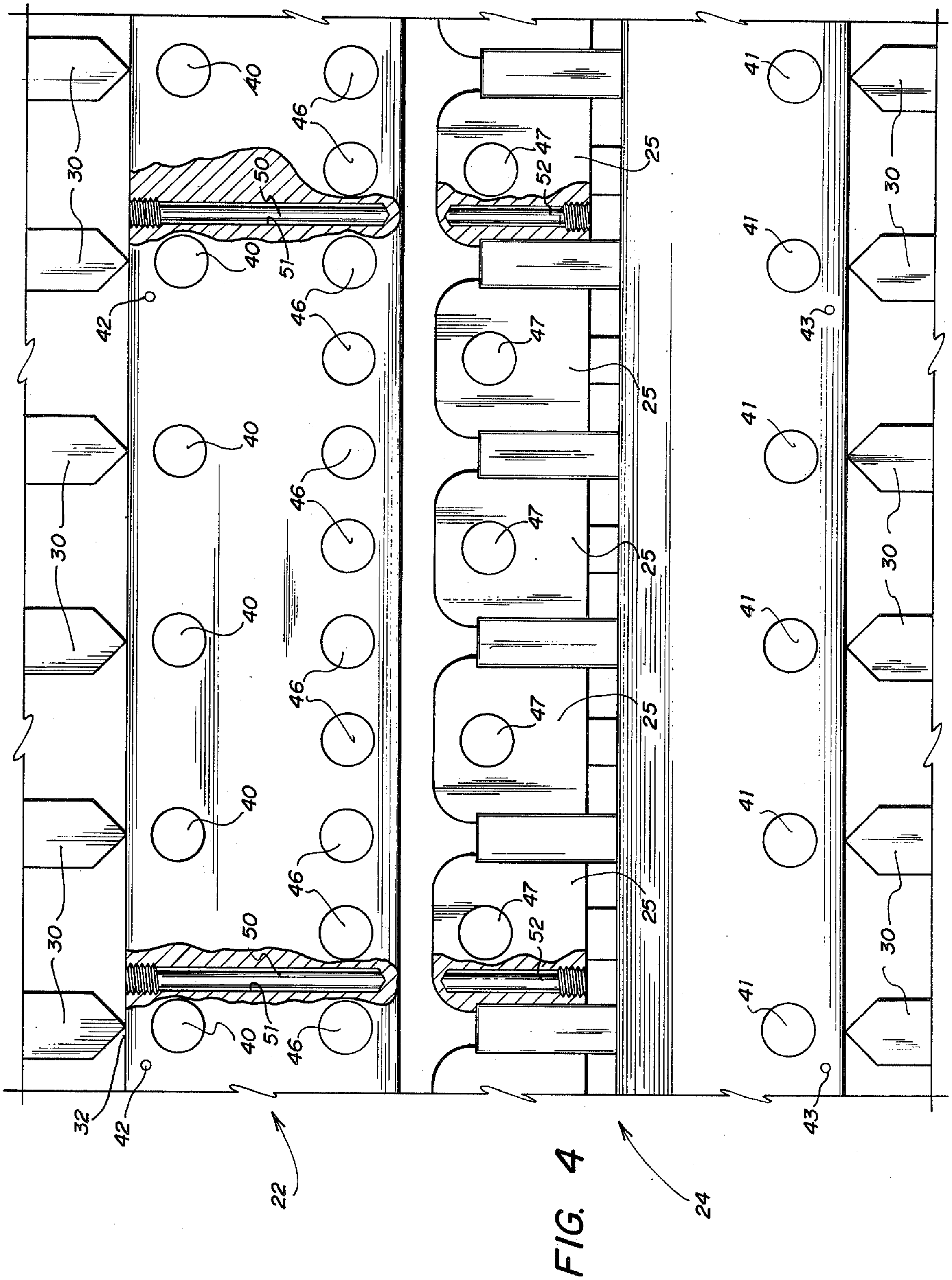
FIG. 4 is an enlarged partial section of a portion of FIG. 1, illustrating the upper and lower portions of the mold with the spacer bars shown in place.

Referring now to FIGS. 1, 2 and 4, a plurality of peripheral heaters 40 and 41 are positioned along the outer surface of upper mold half 22 and lower mold 24, respectively. Heaters 40 and 41 extend along the length of the mold halves and are longitudinally divided into a plurality of zones of varying heating capacities, as will hereinafter be discussed in greater detail.

Heaters 40 and 41 are positioned under prongs 30 to minimize heat gradients in the mold adjacent the points of contact between the spacer bars and the mold surface. These heaters are used during the heat-up period to heat upper end lower mold halves 22 and 24 and thereafter to maintain the outer periphery of the mold at a constant temperature during operation thereof. The operation of heaters 40 and 41 is controlled by a plurality of horizontal thermocouples 42 and 43 spaced across the width and length of mold halves 22 and 24, respectively. As is illustrated in FIG. 4, each thermocouple 42 and 43 is preferably located a distance X from the mold surface and is spaced a distance 2X from the outer surface of one of the peripheral heaters. This spacing has been found to permit the thermocouples to read the temperature in the vicinity of the heaters without being so close to the heater to be inaccurately influenced by the proximity of the heater itself.

Heaters 44 and 45 are positioned at each outer corner of the respective mold halves and have a greater heat capacity output than heaters 40 and 41 to compensate for additional heat losses which occur at the corners of the mold halves. Heaters 44 and 45 are under separate thermocouple control than heaters 40 and 41 in order that a constant periphery temperature may be maintained.

A series of laterally spaced longitudinally positioned operational heaters 46 are positioned in close proximity to the molding surface at the lower surface of upper mold half 22. Likewise, a series of longitudinally positioned operational heaters 47 are positioned in close proximity to the mold surface of pillow bars 25. Heaters 46 and 47 are designed to provide the heat necessary to set or cure the material passing through the mold cavity. The heater at each edge of the molding surface is provided with a different heat output capacity than those in the center area because of a different per heater volume of material molded in the area near the edges and to compensate for heat losses from the sides of the mold assembly. All other heaters in the top molding surfaces are laterally spaced along the width of the mold assembly and are positioned to generate an even heat across the width of the assembly.

Referring to FIG. 2, the ends of all the heaters 40 and 46 in top mold 22 butt against cover plates 48 and 48' across the ends of the mold. Plate 48 serves as a portion of the front end of the adjacent feedbox from which granular material is supplied into the mold cavity. Material flowing in the feedbox and residing in the feed area causes heat losses from the molding structure. Likewise, the cool material carried into the mold cavity during the molding process will draw heat from the mold near the mouth with a differing heat requirement as the material becomes heated while passing through the mold cavity. Similarly, a different heat output capacity is required near the ends of the mold than in the center area due to heat losses through the ends of the mold.

To compensate for heat losses resulting from the introduction of cool material into the mold cavity and heat losses from the ends of the molds, the heaters are designed such that their heating capacity varies along their longitudinal dimensions. This is accomplished in operational heater 46 by using three heater circuits 46*a*, 46*b* and 46*c*. While corresponding heater circuits on the various heaters 46 may be controlled together, the various circuits 46*a*, 46*b* and 46*c* are under separate temperature control. Each heater circuit is divided into one or more zones each having a required heat capacity along its length to generate and maintain a uniform temperature along the longitudinal axis of the mold. For example, circuit 46*c* is a single zone having a relatively high heat capacity such that it is capable of compensating for heat losses to the feedbox area and for heating the material upon entry into the mold capacity. Circuit 46*b* is divided into two zones, 46*b*-1 and 46*b*-2, with the heat capacity of heater element of zone 46*b*-1 being slightly higher than that of zone 46*b*-2 due to its location in relation to initial material compaction. Circuit 46*c* is divided into five zones, 46*c*-1, 46*c*-2, 46c-3, 46c-4 and 46c-5, each having a different heat capacity as illustrated by cross hatching thereon. Thus, the heat capacity of the heater element in zone 46c-5 is greater than that of zone 46c-4 due to its proximity to the end of the mold and the compensation required for heat loss from the end of the mold.

Similarly, heater 47 is divided into three circuits, 47a, 47b and 47c, each other independent temperature control. Each circuit is divided into two or more zones having a different heat capacity as illustrated by the cross hatching thereon in order to compensate for heat loss due to heating of material coming into the mold and heat loss from the ends of the mold sections.

In a preferred embodiment, peripheral heaters 40 and 41 are each single circuit heaters divided into four zones with each zone having a different heat capacity illustrated by the cross hatching shown thereon. Because heaters 46 and 47 function to heat the material as it passes through the mold assembly, it will be noticed that these heaters have a higher heat capacity along corresponding longitudinal positions than heaters 40 and 41.

While the above described embodiment includes the use of a plurality of circuits for heaters 46 and 47, it will be appreciated that a single circuit having a varying heat output capacity along its length may be substituted therefor. Where this substitution is made, the variation in heat capacity along the length of the heaters would be similar to that discussed with respect to the multi circuit heaters described above.

In FIG. 4, it can be seen that all the heaters 46 are controlled by vertically mounted thermocouple assemblies 50. These vertically mounted thermocouples have a tip end which, in the preferred embodiment, is located approximately ⅛ inch under the molding surface for monitoring the temperature at the surface. In order to better shield the thermocouples from the heaters, they are positioned in concentric bores 51 having a diameter slightly larger than that of the thermocouples. These thermocouples can be spaced about the upper mold as desired. Likewise, vertically inserted, tip monitoring thermocouples 52 are mounted in the pillow bars 25. These thermocouples monitor the temperature of the pillow bars and control the output of heaters 47 in order to maintain an even heat throughout the bars.

Thus, according to the present invention, a mold structure is disclosed for isolating the temperature of the mold from the frame, thus reducing the distortion normally induced into the mold due to differential expansion of the frame. The present invention further provides a mold construction whereby an even temperature throughout the mold is maintained, thereby preserving the mold cavity shape and thus facilitating the molding operation.

It is to be understood, of course, that the foregoing disclosure relates only to the preferred embodiments of the present invention and that numerous alterations and modifications can be made therein by those of ordinary skill in the art without departing from the spirit and scope of the invention as set forth in the appended claims.

What is claimed is:

1. In heat forming granular material forced through a mold cavity where a top mold has a surface generally parallel to the longitudinal axis of the mold cavity and forming the upper surface of the cavity and a bottom mold has an uneven contoured surface generally parallel to said axis and forming the lower surface of the cavity, the combination comprising:

a first array of heater means having parallel elements extending in said direction near the surfaces of said mold cavity;

a second array of heater means having parallel elements extending in said direction adjacent to the surfaces of said top and bottom molds remote from said cavity; and means for automatic temperature control of said heater means with control of heaters of said first array independent of each other and control of said heater means in said second array independent of each other and of said first array with all heater means regulated to the same reference temperature.

2. The combination set forth in claim 1 in which said elements have variable capacity for delivery of heat to said molds in the direction of the length thereof.

3. The combination set forth in claim 1 in which the heaters of said first array are all multi circuit heaters wherein each heater circuit has at least one zone of heat along the length thereof.

4. In heat forming a granular material forced through a mold cavity where a top mold has a surface generally parallel to the longitudinal axis of the mold cavity and forms the upper surface of the cavity and a bottom mold has an uneven contoured surface generally parallel to said axis and forms the lower surface of the cavity, the combination comprising:

a first array of heater means having elements extending parallel to said axis adjacent to the surface of said mold cavity, said elements having suitable variable capacity for delivery of heat to said molds in the direction of the length thereof; and means for automatic temperature control of said heater means with control of heaters in said first array independent of each other with all heater means regulated to the same reference temperature.

5. The combination set forth in claim 4 further comprising:

a second array of heater means having elements extending parallel to said axis near the surfaces of said top and bottom molds remote from said cavity;

means for automatic temperature control of said heater means in said second array independent of each other and of said first array.

6. In heat forming a granular material forced through a mold having a mold cavity extending longitudinally therethrough, the combination comprising, a first array of heater means having elements extending longitudinally through said mold and adjacent to the surface of said mold cavity;

said elements of said first array of heater means having variable capacity for delivery of heat to said mold in the direction of the length thereof.

7. The combination set forth in claim 6 further comprising:

a second array of heater means having elements extending longitudinally along said mold and near the surfaces of the mold remote from the cavity;

said elements in said second array of heater means having variable capacity for delivery of heat to said mold in the direction of the length thereof.

8. In heat forming a granular material, the combination comprising:

a heated mold having a mold cavity therethrough in which the granular material is formed;

a frame for supporting said mold;

a spacer bar fitted between said mold and said frame, said spacer bar having minimum points of contact with said mold in order to minimize the heat transfer from said mold to said spacer bar.

9. The combination set forth in claim 8 further comprising:

heater means positioned in the mold adjacent the points of contact between the mold and said spacer bar for maintaining a constant temperature in the mold.

10. The combination set forth in claim 8 wherein said spacer bar is adapted with fluid passages therein for circulating fluid therethrough in order to cool said spacer bar and thereby minimize heat transfer to said frame.

11. In heat forming granular material, the combination comprising:

a heated mold having a mold cavity therethrough in which the granular material is formed;

a frame for supporting said mold;

a spacer bar fitted between said mold and said frames;

heater means positioned in said mold adjacent the points of contact between said mold and said spacer bar for maintaining a constant temperature in said mold.

12. The combination set forth in claim 11 wherein said spacer bar is adapted with fluid passages therein for circulating fluid therethrough in order to cool said spacer bar and thereby minimize heat transfer to said frame.

13. The combination set forth in claim 10 wherein the surface of said spacer bar adjacent said frame is slotted to limit the area of contact with said frame to minimize heat transfer from said mold to said frame.

14. In heat forming a granular material, the combination comprising:

a heated mold having a mold cavity therethrough in which the granular material is formed;

a frame for supporting said mold;

a spacer bar fitted between said mold and said frame, said spacer bar having fluid passages therein for circulating fluid therethrough in order to cool said spacer bar and thereby minimize heat transfer to said frame.

15. In heat forming a granular material, the combination comprising:

a heated mold having a mold cavity therethrough in which the granular material is formed;

a frame for supporting said mold;

a spacer bar fitted between said mold and said frame, said spacer bar being slotted along the surface adjacent said frame to limit the area of contact with said frame to minimize the heat transfer from said mold to said frame.

16. The combination set forth in claim 15 wherein said spacer bar is formed with fluid passages therein for circulating fluid therethrough to cool said spacer bar and thereby minimize heat transfer to said frame.

17. The combination set forth in claim 15 wherein said spacer bar is formed with narrow protrusions on the surface adjacent said mold to minimize heat transfer from said mold to said spacer bar.

* * * * *